United States Patent [19]

Uda

[11] Patent Number: 4,682,500
[45] Date of Patent: Jul. 28, 1987

[54] PRESSURE SENSITIVE ELEMENT

[75] Inventor: Kazutaka Uda, Tenri, Japan

[73] Assignee: Sharp Kabushiki Kaisha, Osaka, Japan

[21] Appl. No.: 848,930

[22] Filed: Apr. 7, 1986

[30] Foreign Application Priority Data

Apr. 11, 1985 [JP] Japan .................................. 60-78003

[51] Int. Cl.$^4$ ............................. G01L 7/08; G01L 9/00
[52] U.S. Cl. .................................. 73/705; 250/231 P; 356/352
[58] Field of Search .......... 73/205; 250/231 R, 231 P, 250/226; 356/352; 29/569 L

[56] References Cited

U.S. PATENT DOCUMENTS 4,329,058  5/1982  James et al. ......................... 356/352
4,408,123 10/1983  Sichling et al. ................. 250/231 R Primary Examiner—Donald O. Woodiel
Attorney, Agent, or Firm—Birch, Stewart, Kolasch & Birch

[57] ABSTRACT

A pressure sensitive element having a pair of light reflecting thin films formed through a thin film producing process and composing a Fabry-Pérot resonator which is arranged so as to face a light transmitting system, and a diaphragm laminated on the light reflecting thin films, wherein an optical path difference is formed in accordance with an interval of an air gap located between the pairs of light reflecting thin films, while the interval of the air gap changes by the deformation of the diaphragm.

4 Claims, 11 Drawing Figures

PRESSURE SENSITIVE ELEMENT

BACKGROUND OF THE INVENTION

The present invention generally relates to a pressure sensitive element of a small size which is employed as a means for measuring pressure and more particularly, to an optical pressure sensor utilizing Fabry-Pérot interference.

Although various kinds of pressure sensitive elements have been developed, since a semiconductor pressure sensor has advantages in that it is small in size and high in accuracy, it has become generally accepted as a means for measuring pressure. The semiconductor pressure sensor has, however, problems in that electrical shielding is necessary in measuring pressure in a human body and noises can to be detected in a strong electromagnetic field because electrical signals are used in measuring pressure. On the other hand, since an optical pressure sensor employing optical signals instead of electric signals does not suffer from the above described problems, pressures can be easily measured. For example, in a type of pressure sensor wherein a diaphragm is mounted on the ends of a bundle of optical fibers so as to detect pressure change as a function of the change of intensity of the reflected light through deflection of the diaphragm, a small pressure sensor which is simple in construction can be obtained with decreased noise. On the contrary, it has a drawback in that the change of the light intensity therein is relatively small. Furthermore, as shown in FIG. 1, a conventional pressure sensor or a sensing portion of a microphone wherein the displacement of the diaphragm is detected by utilizing Fabry-Pérot interference, is provided with a diaphragm 5 of a mica sheet or the like having a thickness of 10 $\mu$m or more, a fiber 6 on the end surface of which Al is deposited, a spacer 8 of a material such as invar or crystal having a small thermal expansion coefficient and a supporting member 9, while the spacer 8 is fixedly mounted on the supporting member 9 so that the diaphragm 5 and the fiber 6 face each other at a required distance, with an air gap being formed therebetween. However, since the diaphragm 5 and the fiber 6 are caused to adhere closely to the spacer 8, it has been difficult to keep the diaphragm 5 and the fiber 6 in a parallel configuration or to keep the air gap constant in height. Accordingly, because the conventional pressure sensor utilizing Fabry-Pérot interference is required to be applied with a machining and assembling process with high accuracy, it has had a problem in that it is limited to small sizes.

SUMMARY OF THE INVENTION

Accordingly, an essential object of the present invention is to provide an improved pressure sensitive element of a small size having a high performance ability by utilizing Fabry-Pérot interference, wherein a pair of upper and lower reflecting films composing a Fabry-Pérot resonator can be easily controlled in the interval therebetween by a thin film producing process.

Another object of the present invention is to provide the pressure sensitive element of the above described type having the requisite uniform properties irrespective of the position into which a fiber is inserted, since an interference by the reflection at the end surface of the fiber is not utilized.

In accomplishing these and other objects, according to one preferred embodiment of the present invention, there is provided a pressure sensitive element having a pair of light reflecting thin films formed through a thin film producing process and composing a Fabry-Pérot resonator which is arranged so as to face a light transmitting system, and a diapragm laminated on the light reflecting thin films, wherein an optical path difference is formed in acordance with an interval of an air gap disposed between the pairs of light reflecting thin films, while the interval of the air gap changes by the deformation of the diaphragm.

BRIEF DESCRIPTION OF THE DRAWINGS

These and other objects and features of the present invention will become apparent from the following description taken in conjunction with the preferred embodiments thereof with reference to the accompanying drawings, wherein

FIG. 2b is a bottom plan view of the pressure sensitive element of FIG. 2a;

FIG. 3b is a bottom plan view of the pressure sensitive element of FIG. 3a; and

DETAILED DESCRIPTION OF THE INVENTION

Figure 1:
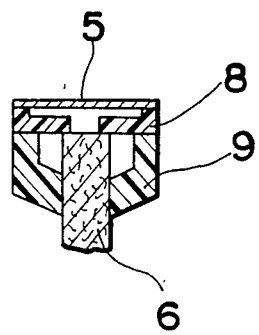
FIG. 1 is a cross sectional view of a conventional pressure sensor utilizing Fabry-Pérot interference.

Before the description of the present invention proceeds, it is to be noted that like parts are designated by like reference numerals throughout the accompanying drawings.

Figure 2A:
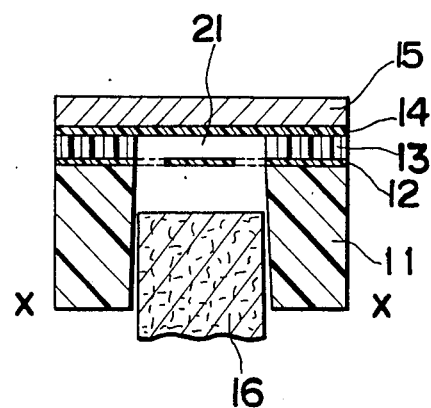
FIG. 2a is a cross sectional view of a pressure sensitive element for fiber according to a first embodiment of the present invention.
Figure 2B:
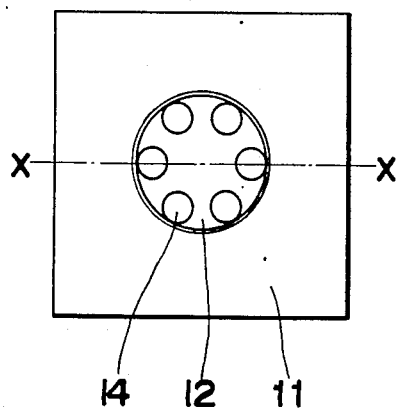

Referring now to the drawings, there is shown in FIGS. 2a and 2b, a pressure sensitive element according to a first preferred embodiment of the present invention, which includes a base plate 11 of photosensitive glass, upper and lower reflecting films 14, 12 composed of a material having a thermal expansion coefficient approximately equal to that of the base plate 11, an intermediate layer 13 disposed between these films 12, 14, and a diaphragm 15 of a high-modulus material. All are formed one upon another successively through a thin film producing process such as electron beam deposition, sputtering CVD (Chemical Vapor Deposition) or the like. A Fabry-Pérot resonator is composed of the aforementioned upper and lower reflecting films 14, 12 and intermediate layer 13, the thickness of which layer corresponds to an air gap defined between both films 12, 14. The film thickness can be easily controlled by utilizing the thin film producing process so that a pressure sensitive portion having a Fabry-Pérot resonator and the diaphragm 15 laminated thereon are formed on the base plate 11. The diaphragm 15 is elastically changed in shape in a vertical direction with respect to its surface according to the pressure level applied thereon. Furthermore, a fiber 16 is upwardly inserted into the base plate 11 from the lower side of the base plate 11 so as to be disposed to face the lower reflecting film 12. Upon formation of the intermediate layer 13 which is a spacer layer between the upper and lower reflecting films 14, 12 through the thin film producing process, the central portion of the intermediate layer 13 is removed therefrom through an etching process so as to be formed annularly. A through-opening which receives the fiber 16 inserted thereinto is also formed in the base plate 11 through a selective etching process. The fiber 16 faces the lower reflecting film 12 at its end surface so that light emitted from a light source is transmitted so as to be applied towards the upper and lower reflecting films 14, 12 from its end surface. Light applied from a light transmitting system such as fiber 16, rod lens 17 or the like is transmitted through and reflected between the upper and lower reflecting films 14, 12. Thereafter, the light is sent to the light transmitting system as a signal light, with the upper and lower reflecting films 14, 12 having a uniform air gap 21 defined therbetween, which interval is determined by the intermediate layer 13. At this moment, in the case where the fiber 16 is treated against reflection by coating, matching oil or the like is inserted into the through-opening from the bottom surface of the base plate 11 of a photosensitive glass, and the pressure sensitive element having uniform and stable properties can be obtained regardless of the position of the end surface of the fiber 16. The lower reflecting film 12 is provided with six circular through-holes defined therein around the aforementioned air gap 21 at positions equally divided therein.

Figure 3A:
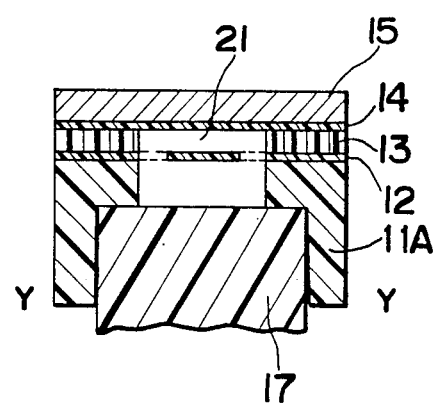
FIG. 3a is a cross sectional view of a pressure sensitive element for rod lens according to a second embodiment of the present invention.
Figure 3B:
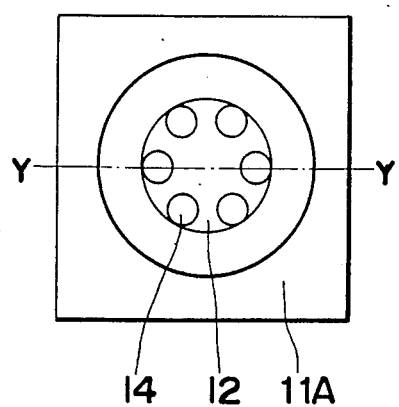

FIGS. 3a and 3b show a pressure sensitive element according to a second embodiment of the present invention, wherein the fiber 16 is replaced by a rod lens 17 and the base plate 11 is also replaced by another base plate 11A having an opening suitable for receiving the rod lens 17 therein.

A process for manufacturing a pressure sensitive element of the present invention will be explained hereinafter.

Figure 4A:
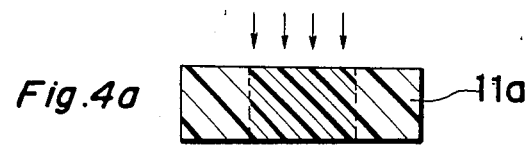
FIGS. 4a through 4f show a process for manufacturing the pressure sensitve element for fiber as shown in FIGS. 2a and 2b.
Figure 4B:
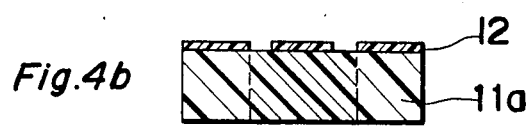
Figure 4C:
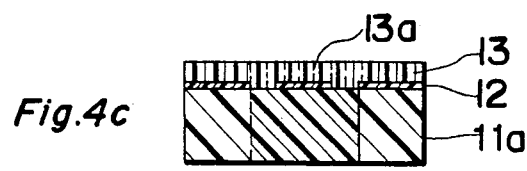
Figure 4D:
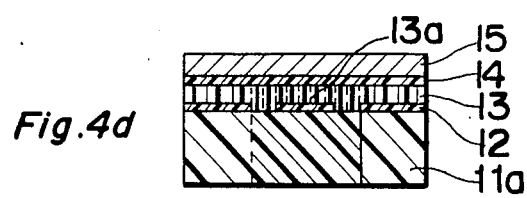
Figure 4E:
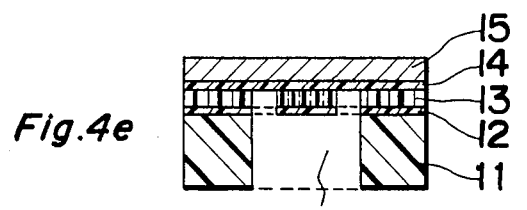
Figure 4F:
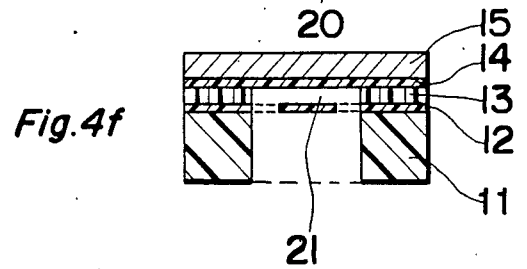

There is illustrated in FIGS. 4a through 4f, a process of manufacturing the pressure sensitive element as shown in FIGS. 2a and 2b. In FIG. 4a, the photosensitive glass base plate 11a is exposed to ultra-violet rays, while having a desired pattern thereon. Upon this heat treatment, the exposed portion of the base plate 11a is crystallized so as to be easily etched. In FIG. 4b, a dielectric multi-layer film such as Y2O3, SiO2, Al2O3, TiO2, Si3N4, amorphous silicon, etc. or a metallic film such as Al, Ni, Ag, Cu, etc. which turns out to be the lower reflecting film 12, is laminated on the aforementioned photosensitive glass base plate 11a through a deposition method, sputtering process, CVD method or the like. Thereafter, six circular through-holes are formed through a photolithography method at the positions equally divided around exposed portion of the base plate 11. Etching liquid is poured into these through-holes so as to form the air gap 21 in the intermediate layer 13 in the after-process. In FIG. 4c, the intermediate layer 13 employing an anisotropic substance such as Si, SiC or the like which can be etched is formed on the whole surface of the lower reflecting film 12 through a sputtering process or CVD method. Furthermore, when the air gap is formed in the intermediate layer 13 in the after-process, the intermediate layer 13, 13a is changed in composition through on ion injection method or thermodiffusion method so as to be etched only at the required portion. The result is that the central portion 13a of the intermediate layer corresponding to the exposed portion of the base plate 11a is caused to be a region which can be easily etched and the circumferential portion 13 thereof is caused to be an etching-retardant region like p-Si. In FIG. 4d, another dielectric multi-layer film or metallic film is formed on the whole surface of the intermediate layer 13, 13a for laminating the upper reflecting film 14 thereon in the same manner as the lower reflecting film 12. In addition, an inorganic solid film or ultra-high modulus alloyed film is laminated on the upper reflecting film 14 through a sputtering method or deposition method, with the aforementioned film being a material such as Al2O3 having a high modulus and a thermal expansion coefficient close to that of the upper reflecting film 14. In FIG. 4e, the photosensitive glass base plate 11 is etched with hydrofluoric acid diluent liquid from the bottom thereof so as to form an opening 20 into which the fiber 16 or the rod lens 17 is inserted. In FIG. 4f, the etching liquid passes through the through-openings defined in the lower reflecting film 12 so that the air gap 21 is desirably formed between the upper and lower reflecting films 14, 12 by etching the central portion 13a of the intermediate layer which is a region capable of being etched. The intermediate layer 13 may be selectively applied with an etching treatment by employing KOH agueous solution, ethylenediamine pyrocatechol aqueous solution (APW) or the like. Upon chipping at the last stage, the pressure sensitive element is achieved by inserting the fiber 16 or the rod lens 17 which is treated against reflection by coating, matching oil or the like, into the photosensitive glass base plate 11.

The relationship between the pressure to be detected and the displacement of the diaphragm 15 at the center thereof is obtained as follows.

$$W = \frac{Pr^4}{64 D}, D = \frac{EH^3}{12(1 - v^2)},$$

wherein W is the displacement of the diaphragm 15 at the center thereof, P is the pressure to be detected, r is the radius of the diaphragm 15, E is the Young's modulus of elastilcity, $v$ is the Poison ratio and H is the film thickness of the diaphragm 15. When the diaphragm 15 is of composed a material such as Al2O3, and the radius (r) of the diaphragm 15 is 90 $\mu$m and the film thickness (H) is 3 $\mu$m, the displacement (W) is 0.026, 0.064, 0.129 $\mu$m respectively, when a pressure of 0.2, 0.5, 1.0 bar is applied on the diaphragm 15. On the assumption, for simplicity, that the upper and lower reflecting films 14, 12 constituting the Fabry-Pérot resonator have the same transmittance and reflectance with each other, when there exists an optical path difference both ways between light transmitted between the upper and lower reflecting films 14, 12 and light reflected therebetween two times, the phase difference $\delta$ is obtained by the following formula.

$$\delta = \frac{4\pi nL \times \cos \theta}{\lambda},$$

wherein n is the refractive index and equals up to 1.0 in the above described case, L is the interval between the upper and lower reflecting films, $\theta$ is the angle of incidence of the light beam and $\lambda$ is the wave length. The ratio of the intensity (Ir) of reflected light relative to the intensity (Ii) of incident light is obtained by the following formula.

$$\frac{Ir}{Ii} = \frac{4R \sin^2(\delta/2)}{(1-R)^2 + 4R \sin^2(\delta/2)},$$

wherein R is the reflectance. When $\delta = 2 m\pi$ (m is a positive integer), since Ir/Ii becomes zero irrespective of the value of reflectance R, all of the light beams transmit between the upper and lower reflecting films 14, 12. However, it is assumed that there is no absorption loss. In the next place, when the rod lens is used, $\theta$ nearly equals zero and where an He-Ne laser ($\lambda = 0.6328$ μm) is employed as the light beam, the interval (air gap) between the upper and lower reflecting films 14, 12 which satisifies the aforementioned conditions, is $L = 0.6328m/2$ (μm). When the reflectance $R = 0.5$, each ratio of the intensity (Ir) of reflected light relative to the intensity (Ii) of incident light under the above described respective pressures is shown in the following table.

| Press. P (bar) | Disp. W (μm) | Ir/Ii |
| --- | --- | --- |
| 0 | 0 | 0 |
| 0.2 | 0.026 | 0.338 |
| 0.5 | 0.064 | 0.740 |
| 1.0 | 0.129 | 0.880 |
| 1.23 | 0.158 (corresponding to λ/4) | 0.889 (max.) |

These approximate solutions have been obtained on the assumption that the interval L between the upper and lower reflecting films changes with the parallel relationship therebetween being maintained.

As is seen from the foregoing description, since pressures can be optically measured, electrical shielding or the like is not required and this results in a pressure sensitive element of extremely small size which is simple in construction. In addition, since noises or the like never arise and high accuracy is not required in the machining process, a pressure sensor of small size having superior detecting performance can be produced in bulk.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A pressure sensitive element which comprises:
    a pair of light reflecting thin films formed through a thin film producing process and composing a Fabry-Pérot resonator which is arranged so as to face a light transmitting system; and
    a pressure deforming member laminated on said light reflecting thin films;
    wherein an optical path difference is formed in accordance with an interval of an air gap located between said pairs of light reflecting thin films, said interval of said air gap changing by the deformation of said pressure deforming member.

2. A method of manufacturing a pressure sensitive element, which comprises the steps of:
    forming a pair of light reflecting thin films which compose a Fabry-Pérot resonator arranged so as to face a light transmitting system, on a base plate through a thin film producing process; and
    laminating a pressure deforming member on said light reflecting thin films through another thin film producing process;
    whereby an optical path difference is formed in said pressure sensitive element in accordance with an interval of an air gap located between said pairs of light reflecting thin films, said interval of said air gap changing by the deformation of said pressure deforming member 3. The pressure sensitive element of claim 1, wherein said light transmitting system is a fiber.

4. The pressure sensitive element of claim 1, wherein said light transmitting system is a rod lens.

* * * * *